(12) United States Patent  
Ishizuki et al.

(10) Patent No.: US 12,498,531 B2
(45) Date of Patent: Dec. 16, 2025

(54) OPTICAL FIBER RIBBON, RIBBON CABLE AND METHOD FOR MANUFACTURING OPTICAL FIBER RIBBON

(71) Applicant: Furukawa Electric Co., Ltd., Tokyo (JP)

(72) Inventors: Kuniaki Ishizuki, Tokyo (JP); Mitsuhiro Iwaya, Tokyo (JP); Minoru Kasahara, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 250 days.

(21) Appl. No.: 18/350,855

(22) Filed: Jul. 12, 2023

(65) Prior Publication Data

US 2025/0020885 A1    Jan. 16, 2025

(51) Int. Cl.
*G02B 6/44* (2006.01)
(52) U.S. Cl.
CPC .................... *G02B 6/448* (2013.01)
(58) Field of Classification Search
CPC ....................................................... G02B 6/448
USPC .......................................................... 385/114
See application file for complete search history.

(56) References Cited

U.S. PATENT DOCUMENTS

2014/0301704 A1 * 10/2014 Tanaka ................ G02B 6/4403
                                                                      385/128
2017/0131511 A1    5/2017 Tanaka et al.
2021/0231896 A1    7/2021 Bickham et al.

FOREIGN PATENT DOCUMENTS

| JP | 62089915 A | * | 4/1987 | ............... G02B 6/44 |
| JP | 9-197209 A | | 7/1997 | |
| JP | 2011-186014 A | | 9/2011 | |
| JP | 2012-27130 A | | 2/2012 | |
| JP | 2013-109173 A | | 6/2013 | |
| JP | 2021-162810 A | | 10/2021 | |
| WO | WO 2016/017060 A1 | | 2/2016 | |

* cited by examiner

*Primary Examiner* — Jerry M Blevins
(74) *Attorney, Agent, or Firm* — Oblon, McClelland, Maier & Neustadt, L.L.P.

(57) ABSTRACT

An optical fiber ribbon includes a plurality of optical fibers and a ribbon layer covering the plurality of optical fibers. A Young's modulus of the ribbon layer is larger than or equal to 290 MPa and smaller than or equal to 1400 MPa. A static frictional coefficient between a plurality of the optical fiber ribbons is larger than or equal to 0.71 and smaller than or equal to 1.12.

5 Claims, 6 Drawing Sheets

OPTICAL FIBER RIBBON, RIBBON CABLE AND METHOD FOR MANUFACTURING OPTICAL FIBER RIBBON

BACKGROUND OF THE INVENTION

Field of the Invention

The present invention relates to an optical fiber ribbon, a ribbon cable and a method for manufacturing an optical fiber ribbon.

Description of the Related Art

Techniques for setting the dynamic frictional coefficient between optical fiber ribbons or colored optical fibers are known. Typically, a long optical fiber ribbon or colored optical fiber is wound around a bobbin and stored. In this case, when the friction of the surface of the optical fiber ribbon or the colored optical fiber is large, an increase in optical loss due to winding collapse, a decrease in work efficiency due to a decrease in separability and collectability, and the like may occur. The technique described in International Publication No. 2016-017060 reduces the dynamic frictional coefficient between colored optical fibers and improves the collectability and the separability of the colored optical fibers. In addition, the technique described in Japanese Patent Application Laid-Open No. 1997-197209 reduces the frictional dynamic coefficient between the optical fiber ribbons and the winding of the optical fiber ribbon due to the bobbin is stabilized.

SUMMARY OF THE INVENTION

However, it is not easy to accurately measure the dynamic frictional coefficient of the surface of the optical fiber ribbon, and it is difficult to suppress winding collapse of the optical fiber ribbon.

In view of the above problems, the present invention intends to provide an optical fiber ribbon capable of easily suppressing winding collapse of the optical fiber ribbon.

According to an aspect of the present invention, there is provided an optical fiber ribbon including a plurality of optical fibers and a ribbon layer covering the plurality of optical fibers. A Young's modulus of the ribbon layer is larger than or equal to 290 MPa and smaller than or equal to 1400 MPa. A static frictional coefficient between a plurality of the optical fiber ribbons is larger than or equal to 0.71 and smaller than or equal to 1.12.

According to another aspect of the present invention, there is provided a method for manufacturing an optical fiber ribbon including a step of applying a ribbon layer resin to a plurality of optical fibers and a step of forming a ribbon layer by irradiating the ribbon layer resin with ultraviolet light. A Young's modulus of the ribbon layer is larger than or equal to 290 MPa and smaller than or equal to 1400 MPa. A static frictional coefficient between a plurality of the optical fiber ribbons is larger than or equal to 0.71 and smaller than or equal to 1.12.

According to the present invention, winding collapse of the optical fiber ribbon can be easily suppressed.

DESCRIPTION OF THE EMBODIMENTS

Figure 1:
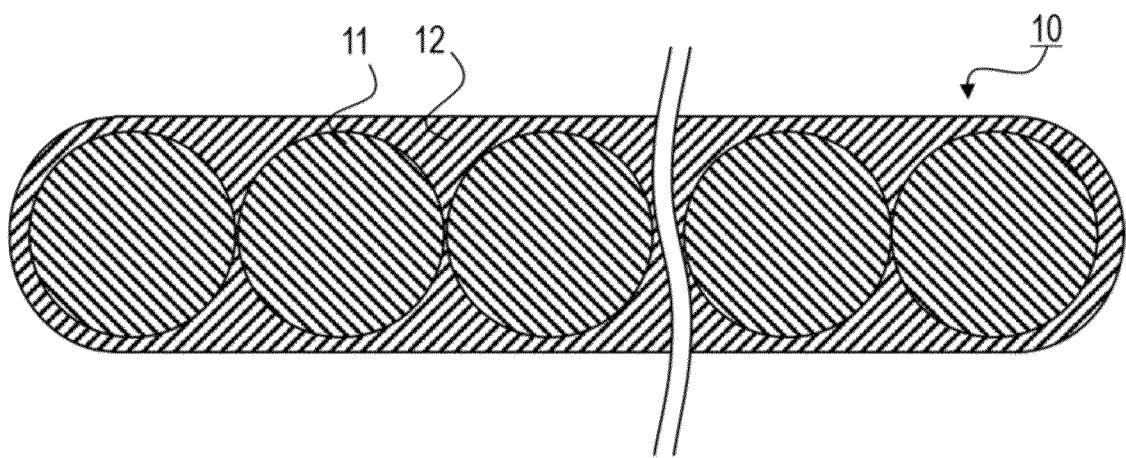
FIG. 1 is a cross-sectional view of an optical fiber ribbon according to a first embodiment.

Embodiments of the present invention will now be described in detail with reference to the accompanying drawings. In the drawings, elements having common functions are denoted by the same reference numerals, and overlapping descriptions may be omitted or simplified.

First Embodiment

FIG. 1 is a cross-sectional view of an optical fiber ribbon 10 according to the present embodiment. The optical fiber ribbon 10 includes a plurality of optical fibers 11 and a ribbon layer 12.

The optical fiber 11 includes a glass fiber and an ultraviolet curing resin covering the outer periphery of the glass fiber. The diameter of the optical fiber 11 may be preferably smaller than or equal to 260 µm, for example, about 250 µm. The outer diameter of the glass fiber may be larger than or equal to 80 µm and smaller than or equal to 150 µm, preferably larger than or equal to 124 µm and smaller than or equal to 126 µm. The surface of the optical fiber 11 may also be colored for identification.

The ribbon layer 12 is made of an ultraviolet curing resin. The ultraviolet curing resin forming the ribbon layer 12 (also referred to as a ribbon layer resin) is not particularly limited as long as it can be polymerized by irradiation with ultraviolet light. The ribbon layer resin may be a resin that can be polymerized by photoradical polymerization or the like, for example. The ribbon layer resin may be an ultraviolet curing resin having a polymerizable unsaturated group such as an ethylenic unsaturated group polymerized and cured by ultraviolet light such as urethane (meth)acrylates such as polyether-based urethane (meth)acrylates and polyester-based urethane (meth)acrylates, epoxy (meth)acrylates, polyester (meth)acrylates, or the like, for example, and it is preferable that the resin have at least two polymerizable unsaturated groups. A polymerizable unsaturated group in the ultraviolet curing resin may be, for example, a group having an unsaturated double bond such as a vinyl group, an allyl group, an acryloyl group, a methacryloyl group, or the like, a group having an unsaturated triple bond such as a propargyl group, or the like. The acryloyl group and the methacryloyl group are preferable out of the groups described above in terms of polymerizability. The ribbon layer resin may be a monomer, an oligomer, or a polymer that initiates polymerization by ultraviolet irradiation to be cured and preferably is an oligomer. Note that the oligomer is a polymer having a degree of polymerization of 2 to 100.

Further, in the present specification, the term "(meth)acrylates" means one or both of acrylates and methacrylates.

Polyether-based urethane (meth)acrylate is a compound having a polyether segment, (meth)acrylate, and a urethane bond as with a product in a reaction of polyol having a polyether framework with an organic polyisocyanate compound and hydroxyalkyl (meth)acrylate. Further, polyester-based urethane (meth)acrylate is a compound having a polyester segment, (meth)acrylate, and a urethane bond as with a product in a reaction of polyol having a polyester framework with an organic polyisocyanate compound and hydroxyalkyl (meth)acrylate.

The plurality of optical fibers 11 are arranged side by side, and the ribbon layer 12 covers and connects the plurality of optical fibers 11. The optical fiber ribbon 10 may be stored wound around a bobbin. When the optical fiber ribbon 10 is wound around the bobbin, a frictional force is generated between two adjacent surfaces of the optical fiber ribbon 10. In the following description, in one optical fiber ribbon 10 wound around a bobbin, a frictional force between two surfaces adjacent to each other may be referred to as a frictional force between a plurality of optical fiber ribbons 10.

When the plurality of optical fiber ribbons 10 are in contact with each other, frictional forces are applied to prevent relative movement between the plurality of optical fiber ribbons 10. A frictional force when one optical fiber ribbon 10 begins to move relative to the other optical fiber ribbon 10 is defined as the static frictional force between the optical fiber ribbons 10. A value obtained by dividing the static frictional force between the optical fiber ribbons 10 by the force applied perpendicularly to the surface of the optical fiber ribbon 10 is defined as a static frictional coefficient. Further, a frictional force when one optical fiber ribbon 10 moves relative to the other optical fiber ribbon 10 is defined as a dynamic frictional force between the optical fiber ribbons 10. A value obtained by dividing the dynamic frictional force between the optical fiber ribbons 10 by the force applied perpendicularly to the surface of the optical fiber ribbon 10 is defined as a dynamic frictional coefficient between the optical fiber ribbons 10.

Here, it is preferable that the optical fiber ribbons 10 are wound around the bobbin such that the optical fiber ribbons 10 do not overlap each other and are aligned so as to be substantially adjacent to each other without a gap. When the optical fiber ribbons 10 overlap each other or when the gaps between the adjacent optical fiber ribbons 10 are non-uniform, in addition to the occurrence of disturbance in the appearance or outer diameter of the bobbin, an increase in transmission loss of light of the wound optical fiber ribbon 10 occurs and the optical fiber ribbon 10 cannot be smoothly fed out from the bobbin. The occurrence of non-uniform winding of the optical fiber ribbon 10 is referred to as winding collapse.

Figure 2:
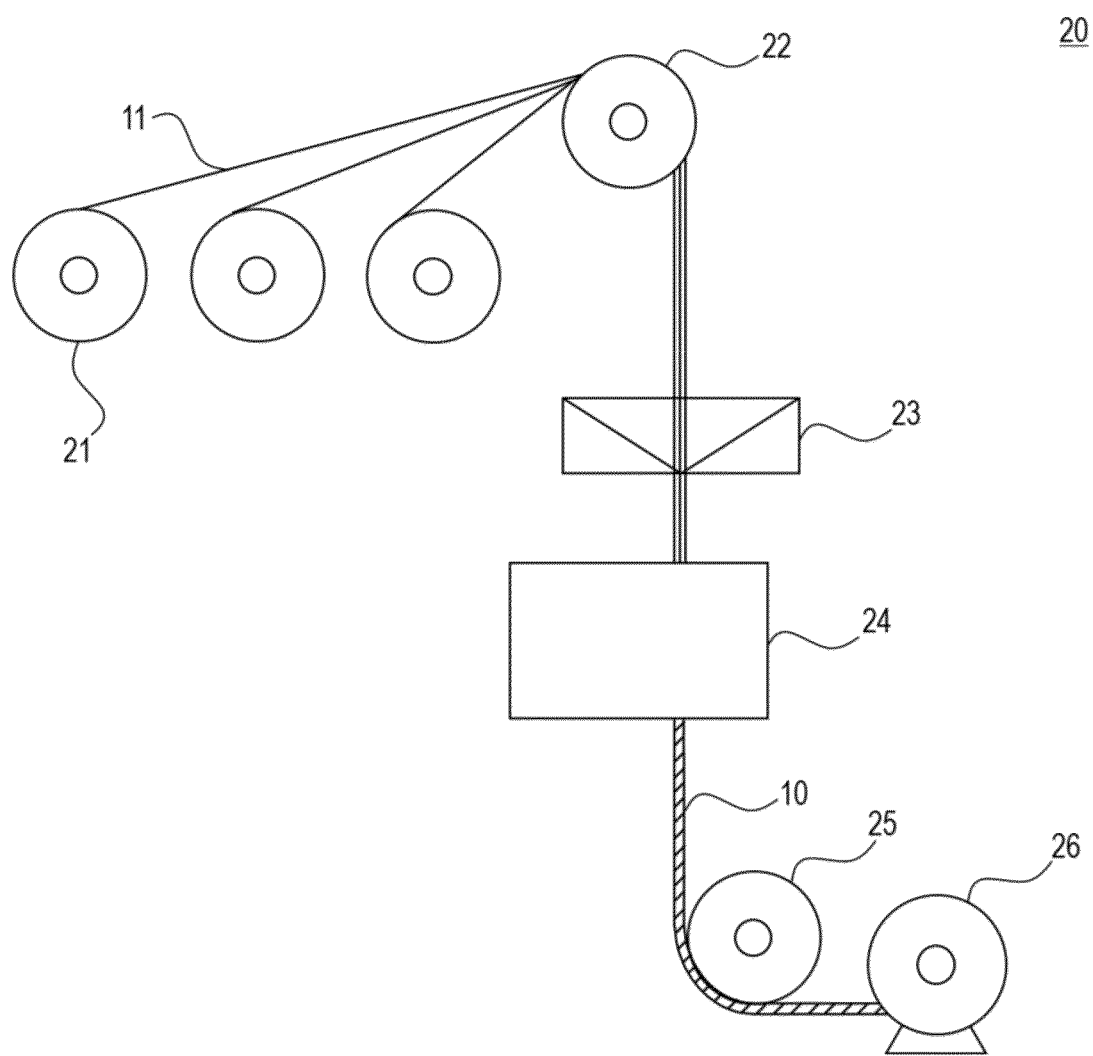
FIG. 2 is a schematic diagram of a manufacturing apparatus of the optical fiber ribbon according to the first embodiment.

FIG. 2 is a schematic diagram of a manufacturing apparatus 20 of the optical fiber ribbon 10 according to the present embodiment. The manufacturing apparatus 20 includes a plurality of supply bobbins 21, a guide roller 22, a resin application apparatus 23, an ultraviolet irradiation apparatus 24, a guide roller 25 and a bobbin 26.

The plurality of supply bobbins 21 are arranged side by side, and each of the supply bobbins 21 has substantially cylindrical shape and is rotatable about a rotation axis. The supply bobbin 21 is driven by a drive motor (not illustrated). An optical fiber 11 is wound around the supply bobbin 21.

The guide roller 22 has a cylindrical shape, and a plurality of grooves are formed along the circumferential direction on the side surface. An optical fiber 11 is held in each groove. The cross-sectional shape of the groove is semicircular, and the diameter of the groove is slightly larger than the diameter of the optical fiber 11.

Under the guide roller 22, a resin application apparatus 23 is provided. The resin application apparatus 23 holds the ribbon layer resin. The resin application apparatus 23 may be, for example, a coating die filled with the ribbon layer resin. The ribbon layer resin is applied to each of the plurality of optical fibers 11 by passing through the resin application apparatus 23.

Under the resin application apparatus 23, an ultraviolet irradiation apparatus 24 is provided. The ultraviolet irradiation apparatus 24 includes any ultraviolet light source such as a metal halide lamp, a mercury lamp, or a UV-LED. The plurality of optical fibers 11 coated with the ribbon layer resin enter the ultraviolet irradiation apparatus 24, and the ribbon layer resin is irradiated with ultraviolet light. As a result, the ribbon layer resin is cured to form a ribbon layer 12.

Under the ultraviolet irradiation apparatus 24, a guide roller 25 and a bobbin 26 are provided. The optical fiber ribbon 10 is guided by the guide roller 25 and wound around the bobbin 26.

Figure 3:
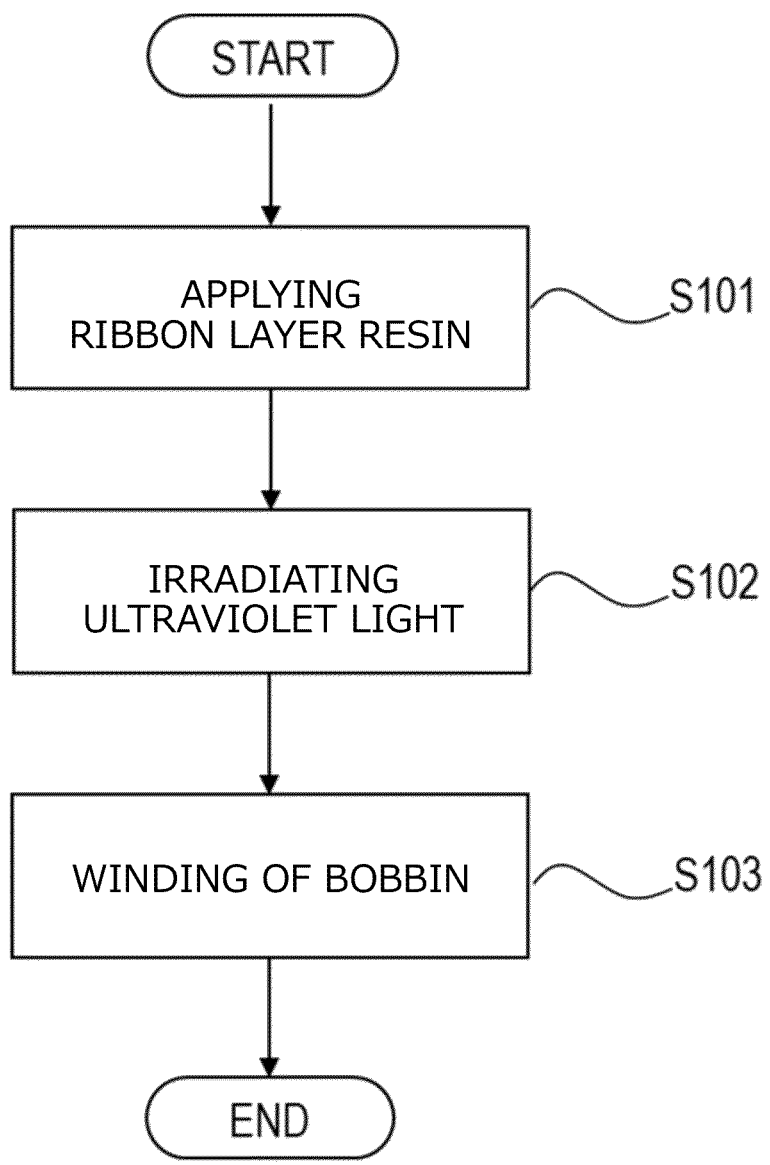
FIG. 3 is a flowchart of a method for manufacturing the optical fiber ribbon according to the first embodiment.

FIG. 3 is a flowchart of a method for manufacturing the optical fiber ribbon 10 according to the present embodiment. The resin application apparatus 23 applies the ribbon layer resin to the plurality of optical fibers 11 (step S101), and the ultraviolet irradiation apparatus 24 irradiates the ribbon layer resin with ultraviolet light (step S102). Thereby, the plurality of optical fibers 11 are covered with the ribbon layer 12, and the optical fiber ribbon 10 is obtained from the plurality of optical fibers 11. The optical fiber ribbon 10 is wound around the bobbin 26 (step S103).

By sliding of the optical fiber ribbon 10 on the optical fiber ribbon 10 sufficiently, the optical fiber ribbon 10 is wound in alignment with the bobbin 26. In contrast, when the frictional force between the plurality of optical fiber ribbons 10 is large, winding collapse of the optical fiber ribbon 10 occurs and an excessive load is applied to a specific portion of the optical fiber ribbon 10. Therefore, the optical transmission loss of the optical fiber ribbon 10 can be increased. In the present embodiment, the static frictional coefficient between the optical fiber ribbons 10 is set to smaller than or equal to 1.12. Thereby, when the optical fiber ribbon 10 is wound around the bobbin 26, the frictional force between the optical fiber ribbons 10 is reduced, and winding collapse of the optical fiber ribbon 10 is suppressed. As a result, the transmission loss due to winding collapse can be reduced. That is, the increase in transmission loss caused when the optical fiber ribbon 10 is wound around the bobbin 26 can be reduced. In the present embodiment, when curing of the ribbon layer resin is insufficient, adhesive force derived from the uncured ribbon layer resin may be generated between the optical fiber ribbons 10. Further, depending on the configuration of the oligomer, monomer, or the like, adhesion may be exhibited on the surface of the optical fiber ribbon 10 even after the optical fiber ribbon 10 is sufficiently cured. This may affect the static frictional forces between the optical fiber ribbons 10. In general, the static frictional coefficient does not depend on the contact area between the objects, whereas the adhesive force may vary depending on the area between the objects. For this reason, in Examples and Comparative Examples described later, the frictional force between the optical fiber ribbons 10 was measured with the contact area between the objects kept constant.

The static frictional coefficient between the optical fiber ribbons 10 can be set to a desired value by the following method. For example, by adding a silicone compound to the ribbon layer resin, the static frictional coefficient between the optical fiber ribbons 10 can be reduced. The silicone compound may be, for example, a polyether modified silicone, an alkyl modified silicone, a urethane acrylate modified silicone, a urethane modified silicone, a methylstyryl modified silicone, an epoxy polyether modified silicone, an alkyl aralkyl polyether modified silicone, or the like. A commercially available product of silicone compounds having no polymerizable group such as ethylenic unsaturated groups include, for example, DOWSIL (trademark) SH 28 Paint Additive (manufactured by Dow Toray Co., Ltd), XIAMETER (trademark) SH 203 Fluid (manufactured by Dow Toray Co., Ltd), DOWSIL 56 Additive (manufactured by Dow Toray Co., Ltd), FM-0411 (manufactured by JNC Corporation), FM-0421 (manufactured by JNC Corporation), and FM-0425 (manufactured by JNC Corporation), DOWSIL SF 8428 Fluid (manufactured by Dow Toray Co. Ltd), BYK-UV 3510 (manufactured by BYK-Chemie Corporation), or the like. A commercially available products of the silicone compound having an ethylenic unsaturated group may be, for example, TEGO (registered trademark) Rad 2200N, TEGO Rad 2500, TEGO Rad 2650, TEGO Rad 2800 (manufactured by Evonik Corporation), or the like.

The silicone compound can not only lower the static frictional coefficient between the optical fiber ribbons 10 but also lower the Young's modulus of the ribbon layer 12. When the amount of the addition of the silicone compound is too large, the Young's modulus of the ribbon layer 12 may become too low. In this case, when the optical fiber ribbon 10 is wound around the bobbin 26, the optical fiber ribbon 10 may deform and winding collapse may occur. Therefore, the addition amount of the addition of the silicone compound is preferably smaller than or equal to 6.5 wt %, more preferably smaller than or equal to 5.0 wt %, still more preferably smaller than or equal to 3.5 wt % of the ribbon layer resin.

Further, depending on the combination of the silicone compound and the ribbon layer resin, the compatibility between the silicone compound and the ribbon layer resin deteriorates, and the ribbon layer resin may become muddy. Further, when the compatibility between the silicone compound and the ribbon layer resin is not good, the ribbon layer resin may phase-separate into the silicone compound and the ribbon layer resin due to storage for a long time. In this case, the static frictional coefficient between the optical fiber ribbons 10 is not sufficiently low, and winding collapse due to the bobbin 26 may occur. Therefore, a combination of the silicone compound and the ribbon layer resin is preferably selected so that the compatibility between the silicone compound and the ribbon layer resin is good.

The method of lowering the static frictional coefficient between the optical fiber ribbons 10 is not limited to the method of adding a silicone compound. For example, a method of increasing the Young's modulus of the ribbon layer 12, a method of performing irradiation with ultraviolet light under a nitrogen atmosphere, a method of performing irradiation with ultraviolet light under a high temperature, and a method of adjusting the concentration of the initiator contained in the ribbon layer resin may be arbitrarily selected or combined.

However, when ultraviolet irradiation is performed under a nitrogen atmosphere, that is under a low oxygen concentration, the cost can be increased by an increase in the usage of inert gas. Further, when the optical fiber ribbon 10 is manufactured at an oxygen concentration higher than a set value due to a failure of the equipment, the risk that the optical fiber ribbon 10 must be manufactured again may increase. In addition, in the case where the irradiation of the ultraviolet light is performed at a high temperature, the frequency of replacement of the UV lamp as the ultraviolet light source and the LED increases, and the manufacturing cost of the optical fiber ribbon 10 may increase. Thus, the method of lowering the static frictional coefficient of the optical fiber 10 may cause manufacturing problems. Therefore, the static frictional coefficient between the optical fiber ribbons 10 is preferably larger than or equal to 0.71 and smaller than or equal to 1.12. This makes it possible to suppress winding collapse of the optical fiber ribbon 10 while avoiding the above-described manufacturing problems.

When the Young's modulus of the ribbon layer 12 is too high, the breaking elongation of the ribbon layer 12 may be reduced. Therefore, the Young's modulus of the ribbon layer 12 is preferably larger than or equal to 290 MPa and smaller than or equal to 1400 MPa. Thereby, it is possible to suppress winding collapse of the optical fiber ribbon 10 while suppressing a decrease in the breaking elongation of the ribbon layer 12.

Figure 4:
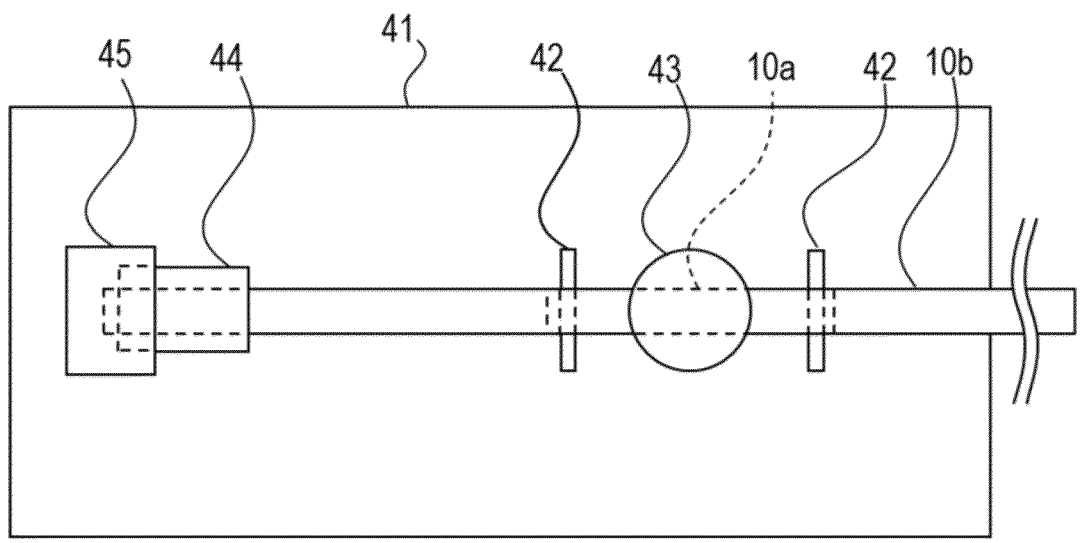
FIG. 4 is a top view of a measuring apparatus for measuring a frictional force between optical fiber ribbons according to the first embodiment.
Figure 5:
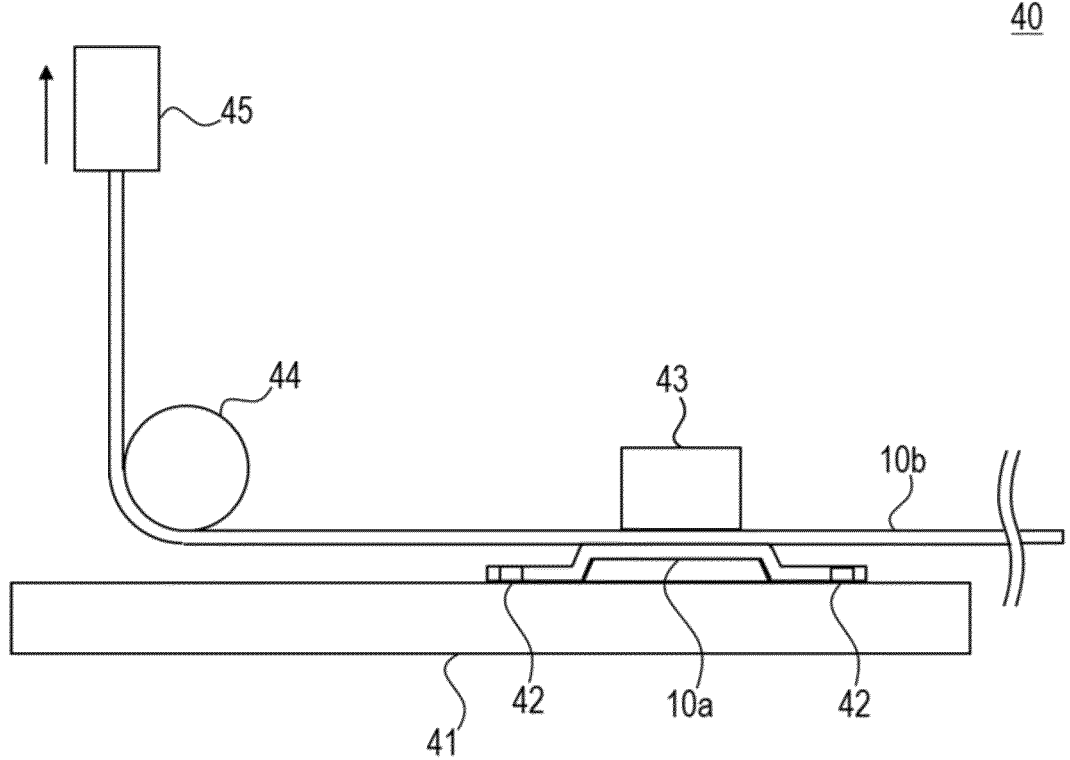
FIG. 5 is a side view of the measuring apparatus for measuring a frictional force between optical fiber ribbons according to the first embodiment.

FIG. 4 is a top view of the measuring apparatus 40 for measuring the frictional force between the optical fiber ribbons according to the first embodiment. FIG. 5 is a side view of the measuring apparatus 40. The measuring apparatus 40 includes a table 41, a fixing tape 42, a weight 43, a pulley 44, and a tensile tester machine 45.

The table 41 has a long plate shape, is placed horizontally with respect to the ground plane, and is made of a hard material such as metal or glass. An optical fiber ribbon 10a is placed on the upper surface of the table 41 along the longitudinal direction of the table 41. The optical fiber ribbon 10a is cut short, and the optical fiber ribbon 10a is arranged in a convex portion corresponding to a portion in contact with the optical fiber ribbon 10b, and both ends of the optical fiber ribbon 10a are fixed to the table 41 by the fixing tape 42. The optical fiber ribbon 10b is placed on the optical fiber ribbon 10a. In Examples and Comparative Examples described later, the optical fiber ribbon 10a and the optical fiber ribbon 10b having a width of 3.0±0.2 mm were stacked with a length of 76 mm. The optical fiber ribbon 10b is made of the same ribbon layer resin as the optical fiber ribbon 10a. The weight 43 has a cylindrical shape and is placed on the optical fiber ribbon 10b. In the following Examples and Comparative Examples, the weight of the weight 43 is 100 gf, and a pressure can be applied to the surfaces of the optical fiber ribbons 10a and 10b in the vertical direction. In the present embodiment, the measured value measured by the above method is referred to as static frictional force. For example, in the case of measuring the static frictional force of the optical fiber ribbon having a width different from that described above, it is desirable to adjust the overlapping length of the optical fiber ribbon 10a and the optical fiber ribbon 10b and match the overlapping area with the above-described measuring method.

The pulley 44 has a cylindrical shape, and an optical fiber ribbon 10b is held along a circumferential direction on a side surface thereof. The tensile tester machine 45 may be configured with any driving system such as hydraulic driving system or electric driving system. The tensile tester machine 45 includes a load cell and detects a load applied to the load cell. The tensile speed of the tensile tester machine 45 may be, for example, 10 mm/min. One end of the optical fiber ribbon 10b is connected to the load cell. The other end of the optical fiber ribbon 10b is held by a rotating bobbin (not illustrated).

When the load cell pulls one end of the optical fiber ribbon 10b with a predetermined tensile load, the lower surface of the optical fiber ribbon 10b moves while contacting the upper surface of the optical fiber ribbon 10a. The tensile load when the optical fiber ribbon 10b begins to move is equal to the static frictional force between the optical fiber ribbons. The static frictional coefficient F can be calculated by the following equation.

[Math 1]

$$F = \mu mg \qquad \text{(equation (1))}$$

Here, μ is the frictional coefficient, F is the tensile load of the tensile tester machine 45, m is the weight of the weight 43, and g is the gravitational acceleration.

After the optical fiber ribbon 10b begins to move on the optical fiber ribbon 10a, the tensile load by the load cell is equal to the dynamic frictional force between the optical fiber ribbon 10a and the optical fiber ribbon 10b. As described later, the dynamic frictional force is not necessarily constant and may vary with the movement of the optical fiber ribbon 10b. The average value of the dynamic frictional force is calculated by integrating and averaging the dynamic frictional force with respect to the moving distance of the optical fiber ribbon 10b. The moving distance used for the integration average is preferably larger than or equal to 5 mm.

When the variation of the dynamic frictional force of the optical fiber ribbon 10b is small, the dynamic frictional force between the optical fiber ribbons can be accurately obtained. The variation of the dynamic frictional force can be evaluated by the relationship between the average value of the dynamic frictional force and the maximum value of the dynamic frictional force or the relationship between the average value of the dynamic frictional force and the minimum value of the dynamic frictional force.

Figure 6:
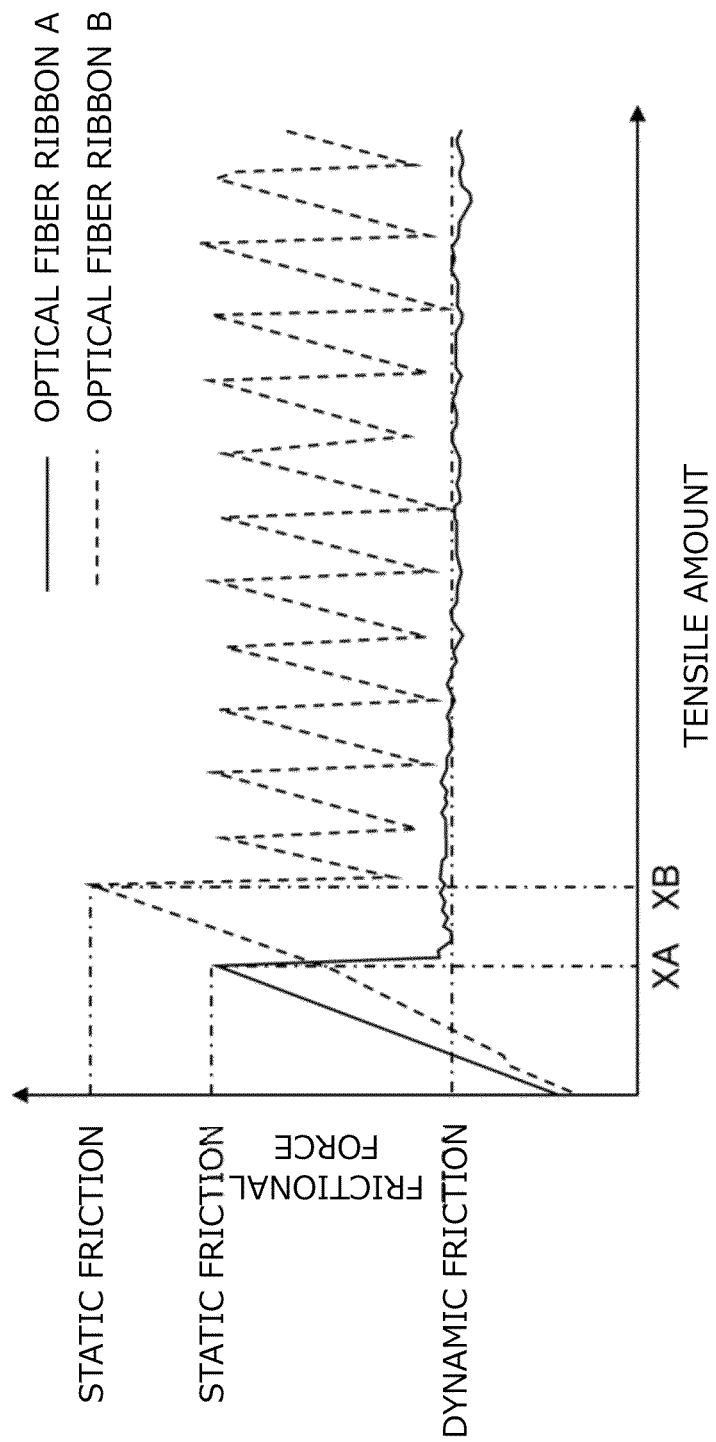
FIG. 6 is a diagram illustrating the static frictional force and the dynamic frictional force between optical fiber ribbons according to the first embodiment.

FIG. 6 is a diagram illustrating static frictional force and dynamic frictional force between optical fiber ribbons according to the present embodiment. FIG. 6 illustrates measurement results of frictional forces between the optical fiber ribbons A and between the optical fiber ribbons B. The measuring apparatus 40 may be used to measure the frictional force. The horizontal axis represents the tensile amount of the optical fiber ribbon 10b by the tensile tester machine 45, that is, the moving distance of the optical fiber ribbon 10b in the tensile tester machine 45. Here, the optical fiber ribbon 10b may extend longitudinally. Therefore, the optical fiber ribbon 10b can rest on the optical fiber ribbon 10a until the tensile amount of the optical fiber ribbon 10b in the tensile tester machine 45 exceeds a predetermined value. The vertical axis represents the frictional force between the optical fiber ribbons. The solid line indicates the frictional force between the optical fiber ribbons A and the broken line indicates the frictional force between the optical fiber ribbons B. When the tensile amount XA is applied to the optical fiber ribbon A, the optical fiber ribbon A begins to move on the optical fiber ribbon A fixed to the table 41. When the tensile amount XB is applied to the optical fiber ribbon B, the optical fiber ribbon B begins to move on the optical fiber ribbon B fixed to the table 41. That is, the frictional force between the optical fiber ribbons A at the tensile amount XA indicates the static frictional force, and the frictional force between the optical fiber ribbons B at the tensile amount XB indicates the static frictional force.

The dynamic frictional force between the optical fiber ribbons A is calculated from the integral average of the tensile load while the optical fiber ribbons A are moving, that is, the frictional force when the tensile amount is greater than the tensile amount XA. Similarly, the dynamic frictional force between the optical fiber ribbons B is calculated from the integral average of the frictional forces when the tensile amount is greater than the tensile amount XB. In the example of FIG. 6, since the dynamic frictional force between the optical fiber ribbons A is substantially constant, the dynamic frictional coefficient can be accurately obtained. In contrast, the dynamic frictional force between the optical fiber ribbons B is not constant, and changes like a saw blade. For example, since curing of the ribbon layer resin is insufficient, the dynamic frictional force is not constant when the adhesive property of the surface of the optical fiber ribbon is high. Further, even when the ribbon layer resin is sufficiently cured, the adhesive property of the surface of the optical fiber ribbon may be high. Also in this case, the dynamic frictional force between the optical fiber ribbons is not constant. When the dynamic frictional force is not constant like the optical fiber ribbon B, it is not easy to accurately obtain the dynamic frictional coefficient. Therefore, it is difficult to set the surface of the optical fiber ribbon B to a desired dynamic frictional coefficient.

In contrast, the static frictional forces between the optical fiber ribbons A and between the optical fiber ribbons B can be easily obtained from the tensile amounts XA and XB. Therefore, the static frictional coefficient can be accurately measured in both the optical fiber ribbons A and B. As illustrated in FIG. 6, the moving distance of the optical fiber ribbon 10b required for measuring the static frictional coefficient is shorter than the moving distance required for measuring the dynamic frictional coefficient. Therefore, the measurement time of the static frictional coefficient can be reduced as compared with the measurement of the dynamic frictional coefficient.

As described above, according to the present embodiment, by defining the optical fiber ribbon by the static frictional coefficient, winding collapse of the optical fiber ribbon can be easily suppressed. In particular, since the static frictional coefficient between the plurality of optical fiber ribbons is set to smaller than or equal to 1.12, the winding of the optical fiber ribbon can be stabilized.

Second Embodiment

A ribbon cable according to a second embodiment of the present invention will be described. The ribbon cable 30 according to the present embodiment is configured using the optical fiber ribbon 10 according to the first embodiment.

Figure 7:
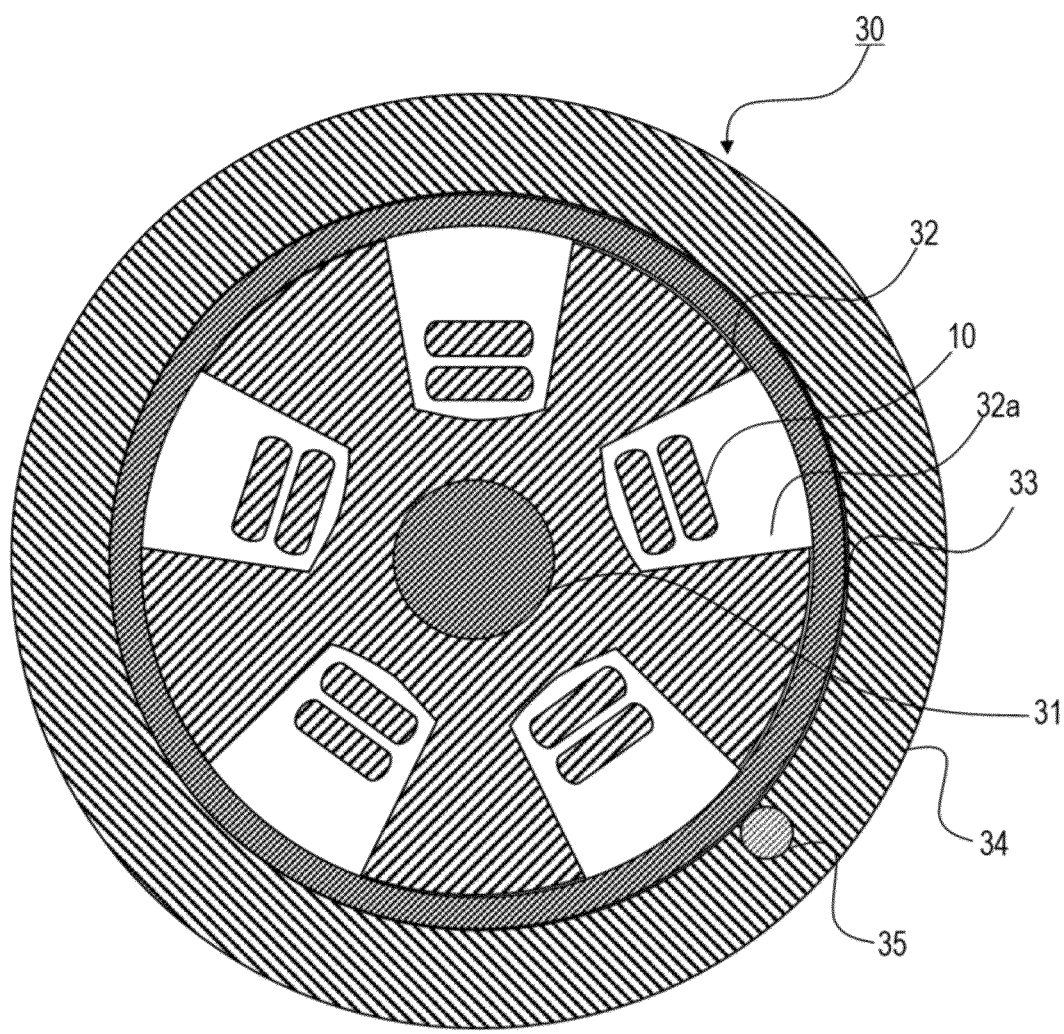
FIG. 7 is a cross-sectional view of a ribbon cable according to a second embodiment.

FIG. 7 is a cross-sectional view of the ribbon cable 30 according to the present embodiment. The ribbon cable 30 includes an optical fiber ribbon 10, a tension member 31, a slot rod 32, a pressing tape 33, a sheath 34, and a tear string 35.

The tension member 31 has a long and thin shape and is made of a material having high hardness such as copper wire or FRP. The tension member 31 has a function of increasing the strength of the ribbon cable 30.

The slot rod 32 is formed around the tension member 31. The slot rod 32 is made of a resin such as polyethylene. A slot 32a is provided along the longitudinal direction on the outer peripheral surface of the slot rod 32, and the optical fiber ribbon 10 is accommodated in the slot 32a. The number of slots 32a and the number of optical fiber ribbons 10 are not limited to the example shown in FIG. 7, and any number may be selected.

The pressing tape 33 is provided so as to cover the outer periphery of the slot rod 32. The pressing tape 33 has a function of sealing the optical fiber ribbon 10 accommodated in the slot 32a so as not to exit from the slot 32a. The pressing tape 33 may be made of a material such as nonwoven fabric or resin.

The sheath 34 is provided so as to cover the outer periphery of the pressing tape 33. The sheath 34 is made of a resin such as polyethylene, and has a function of protecting the optical fiber ribbon 10 from external force.

The tear string 35 is embedded in the sheath 34, and is provided along a part of the outer periphery of the pressing tape 33. The tear string 35 is made of a high strength material such as aramid fiber. By pulling the tear string 35 radially outward of the ribbon cable 30, the optical fiber ribbon 10 can be taken out without damaging.

In the process of manufacturing the ribbon cable 30, the optical fiber ribbon 10 wound around the bobbin 26 is pulled out. The static frictional coefficient between the plurality of optical fiber ribbons 10 according to the first embodiment is set to smaller than or equal to 1.12 to stabilize winding of the optical fiber ribbon 10. Therefore, the ribbon cable 30 in which the transmission loss of light in the manufacturing process of the ribbon cable 30 is suppressed can be obtained without setting the dynamic frictional coefficient between the optical fiber ribbons 10.

EXAMPLES

Hereinafter, measurement results and evaluation of the optical fiber ribbon 10 according to the embodiment of the present invention will be described.

manufactured optical fiber ribbon 10 was stripped using a single edge or the like. The stripped ribbon layer 12 was molded into a sample piece having a length of 25 mm, and the state of the sample piece was adjusted for more than 4 hours under constant temperature and humidity (temperature: 23° C., humidity: 50%). The cross-sectional area of the sample pieces was measured by a microscope. Then, the sample piece was pulled at a tensile speed of 1 mm/min, and the Young's modulus of the sample piece at 2.5% strain was calculated.

A method for measuring the "resin transmittance" in Table 1 will be described. First, a ribbon layer resin containing a silicone compound was sufficiently stirred and defoamed. Then, the ribbon layer resin was filled in a 10 mm long cell and subjected to UV-vis measurement (PerkinElmer, Lambda900). A wavelength region of 300 nm to 800 nm was measured at 150 nm/min, and the transmittance of the ribbon layer resin was determined at a wavelength of 600 nm. An empty cell was used as a reference for the transmittance measurement, and zero-point correction was performed using the transmittance of ethanol.

"Evaluation 1" in Table 1 represents whether or not winding collapse due to the bobbin 26 at the time of manufacturing the optical fiber ribbon 10 occurs. The Evaluation 1 is determined to be good (OK) when the winding collapse due to the bobbin 26 of the optical fiber ribbon 10 does not occur, and the Evaluation 1 is determined to be poor (NG) when the winding collapse occurs. "Evaluation 2" in Table 1 represents whether or not the compatibility between the ribbon layer resin and the silicone compound is good. A ribbon layer resin containing a sufficiently stirred and defoamed silicone compound is placed in a glass bottle and is standing still in a thermostatic bath at 60° C. for 7 days, and when apparent phase separation is not caused, Evaluation 2 is determined to be good (OK), and when apparent

TABLE 1

|  | Young's modulus MPa | static frictional coefficient | (maximum dynamic friction minus average dynamic friction)/average dynamic friction % | (average dyamic friction minus minimum dynamic friction)/average dynamic friction % | resin transmittance % | Evaluation 1 | Evaluation 2 |
| --- | --- | --- | --- | --- | --- | --- | --- |
| Example 1 | 1400 | 0.97 | 42.5 | 47.1 | 88.1 | OK | OK |
| Example 2 | 860 | 0.80 | 4.7 | 4.6 | 88.9 | OK | OK |
| Example 3 | 850 | 0.71 | 29.5 | 30.1 | 42.0 | OK | NG |
| Example 4 | 630 | 1.04 | 54.6 | 53.0 | 93.0 | OK | OK |
| Example 5 | 440 | 1.10 | 11.7 | 27.6 | 1.3 | OK | NG |
| Example 6 | 290 | 1.12 | 26.2 | 31.8 | 93.0 | OK | OK |
| Comparative Example 1 | 460 | 1.95 | 4.6 | 8.4 | 2.1 | NG | NG |
| Comparative Example 2 | 390 | 3.17 | 13.6 | 10.9 | 82.0 | NG | OK |
| Comparative Example 3 | 370 | 1.22 | 2.7 | 5.7 | 1.4 | NG | NG |

Table 1 shows the Young's modulus (MPa) of the ribbon layer 12, the static friction coefficient between the optical fiber ribbons 10, the (maximum dynamic friction minus average dynamic friction)/average dynamic friction (%) between the optical fiber ribbons 10, the (average dynamic friction minus minimum dynamic friction)/average dynamic friction (%) of the optical fiber ribbon 10, the resin transmittance (%), the evaluation (Evaluation 1) on the stability of winding by the bobbin, and the evaluation (Evaluation 2) on the stability of the ribbon layer resin. The ribbon layer resins in Examples 1 to 6 and Comparative Examples 1 to 3 contain a silicone compound.

A method of measuring the "Young's modulus" in Table 1 will be described. First, the ribbon layer 12 of the phase separation is caused, Evaluation 2 is determined to be poor (NG). The apparent phase separation means, for example, a case where a large difference in refractive index and transmittance occurs between the upper layer and the lower layer of the ribbon layer resin, or a case where a difference in transparency occurs depending on the location of the resin by visual observation.

In Example 1, the Young's modulus of the ribbon layer 12 was 1400 MPa. The static frictional coefficient between the optical fiber ribbons 10 was 0.97. The ratio of the difference between the maximum value and the average value with respect to the average value of the dynamic frictional force between the optical fiber ribbons 10 was 42.5%, and the ratio of the difference between the minimum value and the average value with respect to the average value of the dynamic frictional force was 47.1%. The transmittance of the ribbon layer resin of the optical fiber ribbon 10 was 88.1%. In Example 1, winding collapse due to the bobbin 26 did not occur, and the Evaluation 1 was good (OK). Further, phase separation between the ribbon layer resin and the silicone compound after standing still for 7 days did not occur, and the evaluation 2 was good (OK).

In Example 2, the Young's modulus of the ribbon layer 12 was 860 MPa. The static frictional coefficient between the optical fiber ribbons 10 was 0.80. The ratio of the difference between the maximum value and the average value with respect to the average value of the dynamic frictional force between the optical fiber ribbons 10 was 4.78, and the ratio of the difference between the minimum value and the average value with respect to the average value of the dynamic friction force was 4.6%. The transmittance of the ribbon layer resin of the optical fiber ribbon 10 was 88.9%. In Example 2, winding collapse due to the bobbin 26 did not occur, and the Evaluation 1 was good (OK). Further, phase separation between the ribbon layer resin and the silicone compound after standing still for 7 days did not occur, and the Evaluation 2 was good (OK).

In Example 3, the Young's modulus of the ribbon layer 12 was 850 MPa. The static frictional coefficient between the optical fiber ribbons 10 was 0.71. The ratio of the difference between the maximum value and the average value with respect to the average value of the dynamic frictional force between the optical fiber ribbons 10 was 29.5%, and the ratio of the difference between the minimum value and the average value with respect to the average value of the dynamic frictional force was 30.1%. The transmittance of the ribbon layer resin of the optical fiber ribbon 10 was 42.0%. In Example 3, winding collapse due to the bobbin 26 did not occur, and the Evaluation 1 was good (OK). Further, the ribbon layer resin and the silicone compound after standing still for 7 days were phase-separated, and the Evaluation 2 was poor (NG).

In Example 4, the Young's modulus of the ribbon layer 12 was 630 MPa. The static frictional coefficient between the optical fiber ribbons 10 was 1.04. The ratio of the difference between the maximum value and the average value with respect to the average value of the dynamic frictional force between the optical fiber ribbons 10 was 54.6%, and the ratio of the difference between the minimum value and the average value with respect to the average value of the dynamic frictional force was 53.0%. The transmittance of the ribbon layer resin of the optical fiber ribbon 10 was 93.0%. In Example 4, winding collapse due to the bobbin 26 did not occur, and the Evaluation 1 was good (OK). Further, phase separation between the ribbon layer resin and the silicone compound after standing still for 7 days did not occur, and the evaluation 2 was good (OK).

In Example 5, the Young's modulus of the ribbon layer 12 was 440 MPa. The static frictional coefficient between the optical fiber ribbons 10 was 1.10. The ratio of the difference between the maximum value and the average value with respect to the average value of the dynamic frictional force between the optical fiber ribbons 10 was 11.7%, and the ratio of the difference between the minimum value and the average value with respect to the average value of the dynamic frictional force was 27.6%. The transmittance of the ribbon layer resin of the optical fiber ribbon 10 was 1.3%. In Example 5, winding collapse due to the bobbin 26 did not occur, and the Evaluation 1 was good (OK). Further, the ribbon layer resin and the silicone compound after standing still for 7 days were phase-separated, and the Evaluation 2 was poor (NG).

In Example 6, the Young's modulus of the ribbon layer 12 was 290 MPa. The static frictional coefficient between the optical fiber ribbons 10 was 1.12. The ratio of the difference between the maximum value and the average value with respect to the average value of the dynamic frictional force between the optical fiber ribbons 10 was 26.2%, and the ratio of the difference between the minimum value and the average value with respect to the average value of the dynamic frictional force was 31.8%. The transmittance of the ribbon layer resin of the optical fiber ribbon 10 was 93.0%. In Example 6, winding collapse due to the bobbin 26 did not occur, and the Evaluation 1 was good (OK). Further, phase separation between the ribbon layer resin and the silicone compound after standing still for 7 days did not occur, and the Evaluation 2 was good (OK).

In Comparative Example 1, the Young's modulus of the ribbon layer 12 was 460 MPa. The static frictional coefficient between the optical fiber ribbons 10 was 1.95. The ratio of the difference between the maximum value and the average value with respect to the average value of the dynamic frictional force between the optical fiber ribbons 10 was 4.6%, and the ratio of the difference between the minimum value and the average value with respect to the average value of the dynamic frictional force was 8.4%. The transmittance of the ribbon layer resin of the optical fiber ribbon 10 was 2.1%. In Comparative Example 1, winding collapse due to the bobbin 26 occurred, and the Evaluation 1 was poor (NG). Further, the ribbon layer resin and the silicone compound after standing still for 7 days were phase-separated, and the Evaluation 2 was poor (NG).

In Comparative Example 2, the Young's modulus of the ribbon layer 12 was 390 MPa. The static frictional coefficient between the optical fiber ribbons 10 was 3.17. The ratio of the difference between the maximum value and the average value with respect to the average value of the dynamic frictional force between the optical fiber ribbons 10 was 13.6%, and the ratio of the difference between the minimum value and the average value with respect to the average value of the dynamic friction force was 10.9%. The transmittance of the ribbon layer resin of the optical fiber ribbon 10 was 82.0%. In Comparative Example 2, winding collapse due to the bobbin 26 occurred, and the Evaluation 1 was poor (NG). Further, phase separation between the ribbon layer resin and the silicone compound after standing still for 7 days did not occur, and the Evaluation 2 was good (OK).

In Comparative Example 3, the Young's modulus of the ribbon layer 12 was 370 MPa. The static frictional coefficient between the optical fiber ribbons 10 was 1.22. The ratio of the difference between the maximum value and the average value with respect to the average value of the dynamic frictional forces of the optical fiber ribbons 10 was 2.7%, and the ratio of the difference between the minimum value and the average value with respect to the average value of the dynamic frictional forces of the optical fiber ribbons 10 was 5.7%. The transmittance of the ribbon layer resin of the optical fiber ribbon 10 was 1.4%. In Comparative Example 3, winding collapse due to the bobbin 26 occurred, and the Evaluation 1 was poor (NG). Further, the ribbon layer resin and the silicone compound after standing still for 7 days were phase-separated, and the Evaluation 2 was poor (NG).

According to the measurement results of the optical fiber ribbons 10 in Examples 1 to 6 and Comparative Examples 1 to 3, the static frictional coefficient between the plurality of optical fiber ribbons 10 is preferably smaller than or equal to 1.12. Thereby, winding collapse of the optical fiber ribbon 10 due to the bobbin 26 can be suppressed.

Further, the Young's modulus of the ribbon layer 12 is preferably larger than or equal to 290 MPa and smaller than or equal to 1400 MPa. Thereby, winding collapse caused by deformation of the optical fiber ribbon 10 when the optical fiber ribbon 10 is wound by the bobbin 26 can be suppressed.

Further, even in a case where it is difficult to accurately measure the dynamic frictional coefficient between the optical fiber ribbons 10, when the ratio between the average value of the dynamic frictional forces between the optical fiber ribbons 10 and the difference between the maximum value of the dynamic frictional forces and the average value of the dynamic frictional forces, or the ratio between the average value of the dynamic frictional forces and the difference between the average value of the dynamic frictional forces and the minimum value of the dynamic friction forces is larger than or equal to 11.78, the static frictional coefficient between the optical fiber ribbons 10 of smaller than or equal to 1.12 can be used as an index for suppressing winding collapse of the optical fiber ribbons 10 due to the bobbin 26.

The ribbon layer resin preferably has a transmittance of larger than or equal to 82% at a wavelength of 600 nm. Thereby, the compatibility between the ribbon layer resin and the silicone compound becomes good. Therefore, even when the ribbon layer resin is stored for a long period, winding collapse of the optical fiber ribbon 10 due to the bobbin 26 can be suppressed.

As described above, according to the present embodiment, by defining the static frictional coefficient between the optical fiber ribbons, winding collapse of the optical fiber ribbons can be easily suppressed.

The present invention is not limited to the embodiments described above, and various modifications are possible. For example, an example in which a configuration of a part of any embodiment is added to another embodiment or an example in which a configuration of a part of another embodiment is substituted is also an embodiment of the present invention. In addition, a known technique or a known technique in the technical field can be appropriately applied to a specific description or a portion not illustrated in the embodiments.

What is claimed is:

1. An optical fiber ribbon comprising:
   a plurality of optical fibers; and
   a ribbon layer covering the plurality of optical fibers,
   wherein a Young's modulus of the ribbon layer is larger than or equal to 290 MPa and smaller than or equal to 1400 MPa, and
   wherein a static frictional coefficient between a plurality of the optical fiber ribbons is larger than or equal to 0.71 and smaller than or equal to 1.12, and
   wherein a ratio of an average value of a dynamic frictional force between the optical fiber ribbons and a difference between a maximum value of the dynamic frictional force and an average value of the dynamic frictional force, or a ratio of an average value of the dynamic frictional force and a difference between an average value of the dynamic frictional force and a minimum value of the dynamic frictional force is larger than or equal to 11.7%.

2. The optical fiber ribbon according to claim 1, wherein the ribbon layer includes a silicone compound.

3. A ribbon cable comprising:
   an optical fiber ribbon according to claim 1; and
   a sheath accommodating the optical fiber ribbon.

4. A method for manufacturing an optical fiber ribbon comprising:
   a step of applying a ribbon layer resin to a plurality of optical fibers; and
   a step of forming a ribbon layer by irradiating the ribbon layer resin with ultraviolet light,
   wherein a Young's modulus of the ribbon layer is larger than or equal to 290 MPa and smaller than or equal to 1400 MPa, and
   wherein a static frictional coefficient between a plurality of the optical fiber ribbons is larger than or equal to 0.71 and smaller than or equal to 1.12, and
   wherein a ratio of an average value of a dynamic frictional force between the optical fiber ribbons and a difference between a maximum value of the dynamic frictional force and an average value of the dynamic frictional force, or a ratio of an average value of the dynamic frictional force and a difference between an average value of the dynamic frictional force and a minimum value of the dynamic frictional force is larger than or equal to 11.7%.

5. An optical fiber ribbon comprising:
   a plurality of optical fibers; and
   a ribbon layer covering the plurality of optical fibers,
   wherein a Young's modulus of the ribbon layer is larger than or equal to 290 MPa and smaller than or equal to 1400 MPa, and
   wherein a static frictional coefficient between a plurality of the optical fiber ribbons is larger than or equal to 0.71 and smaller than or equal to 1.12, and
   wherein a ribbon layer resin constituting the ribbon layer has a transmittance of larger than or equal to 82% at a wavelength of 600 nm and the ribbon layer resin has good compatibility with a silicone compound included in the ribbon layer.

* * * * *